United States Patent [19]

Kemp et al.

[11] 4,178,665

[45] Dec. 18, 1979

[54] METHOD OF MAKING A FABRICATED GATE VALVE

[75] Inventors: Willard E. Kemp; Bert L. Morrison, both of Houston, Tex.

[73] Assignee: ACF Industries, Incorporated, New York, N.Y.

[21] Appl. No.: 868,008

[22] Filed: Jan. 9, 1978

Related U.S. Application Data

[63] Continuation of Ser. No. 734,155, Oct. 20, 1976, abandoned, which is a continuation-in-part of Ser. No. 623,236, Oct. 17, 1975, abandoned.

[51] Int. Cl.² .................. F16K 27/10; B23K 28/02
[52] U.S. Cl. .................. 29/157.1 R; 29/446; 29/447; 228/231
[58] Field of Search .......... 29/157.1 R, 447, 453, 29/446; 228/231, 232; 251/329, 328, 367, 366

[56] References Cited

U.S. PATENT DOCUMENTS

| | | | |
|---|---|---|---|
| 773,642 | 11/1904 | Hayden et al. | 251/328 |
| 1,743,338 | 1/1930 | Field | 29/157.1 R |
| 1,874,405 | 8/1932 | Wood | 251/328 |
| 2,034,418 | 3/1936 | Plant | 29/157.1 R |
| 2,834,097 | 5/1958 | Eichenberg et al. | 29/157.1 R |
| 3,049,794 | 8/1962 | Bredtschneider | 29/157.1 R |
| 3,115,696 | 12/1963 | Evans | 29/447 |
| 3,197,175 | 7/1965 | Siepmann | 251/329 |
| 3,273,853 | 9/1966 | Pool et al. | 251/328 |
| 3,314,442 | 4/1967 | Volpin | 251/329 |
| 3,442,286 | 5/1969 | Anderson et al. | 251/329 |
| 3,525,139 | 8/1970 | Fournier | 29/453 |
| 3,591,134 | 7/1971 | Fujiwara | 251/172 |
| 3,919,756 | 11/1975 | Kajrup | 29/157.1 R |

FOREIGN PATENT DOCUMENTS

| | | | |
|---|---|---|---|
| 11049 | 11/1956 | Fed. Rep. of Germany | 251/329 |
| 2038055 | 2/1972 | Fed. Rep. of Germany | 251/329 |
| 1005913 | 4/1952 | France | 29/157.1 R |

OTHER PUBLICATIONS

*Welding Handbook,* Third Edition, American Welding Society, N.Y., N.Y., 1950, p. 1366.

*Primary Examiner*—Francis S. Husar
*Assistant Examiner*—Daniel C. Crane
*Attorney, Agent, or Firm*—Eugene N. Riddle

[57] ABSTRACT

A method of fabricating a gate valve having a hollow body with inlet and outlet conduits mounted therein and seat support members mounted on inner ends of the conduits includes fabricating and stress relieving a seat support assembly, then machining it to finished dimensions, then inserting the seat support assembly into a hollow body member. After this is done, the seat support assembly is welded inside the hollow body member. Local stress relieving of welds in the body can be employed during and after assembly and welding.

One arrangement includes inlet and outlet conduit sections welded to the hollow body and opposed inner conduit sections having the opposed seat support members thereon with the inner conduit sections welded to the inlet and outlet conduit sections from a position inside the conduits to form a continuation of the outer conduit sections. Another arrangement includes inlet and outlet conduits having seat support members welded and finish machined prior to assembly. These conduits are positioned inside the hollow body with the seat support members in a spaced relation and welded inside the hollow body. Annular grooves in the seat support members adjacent the seat pockets aid in stress relieving. A gate is movably mounted between the seat support members.

3 Claims, 24 Drawing Figures

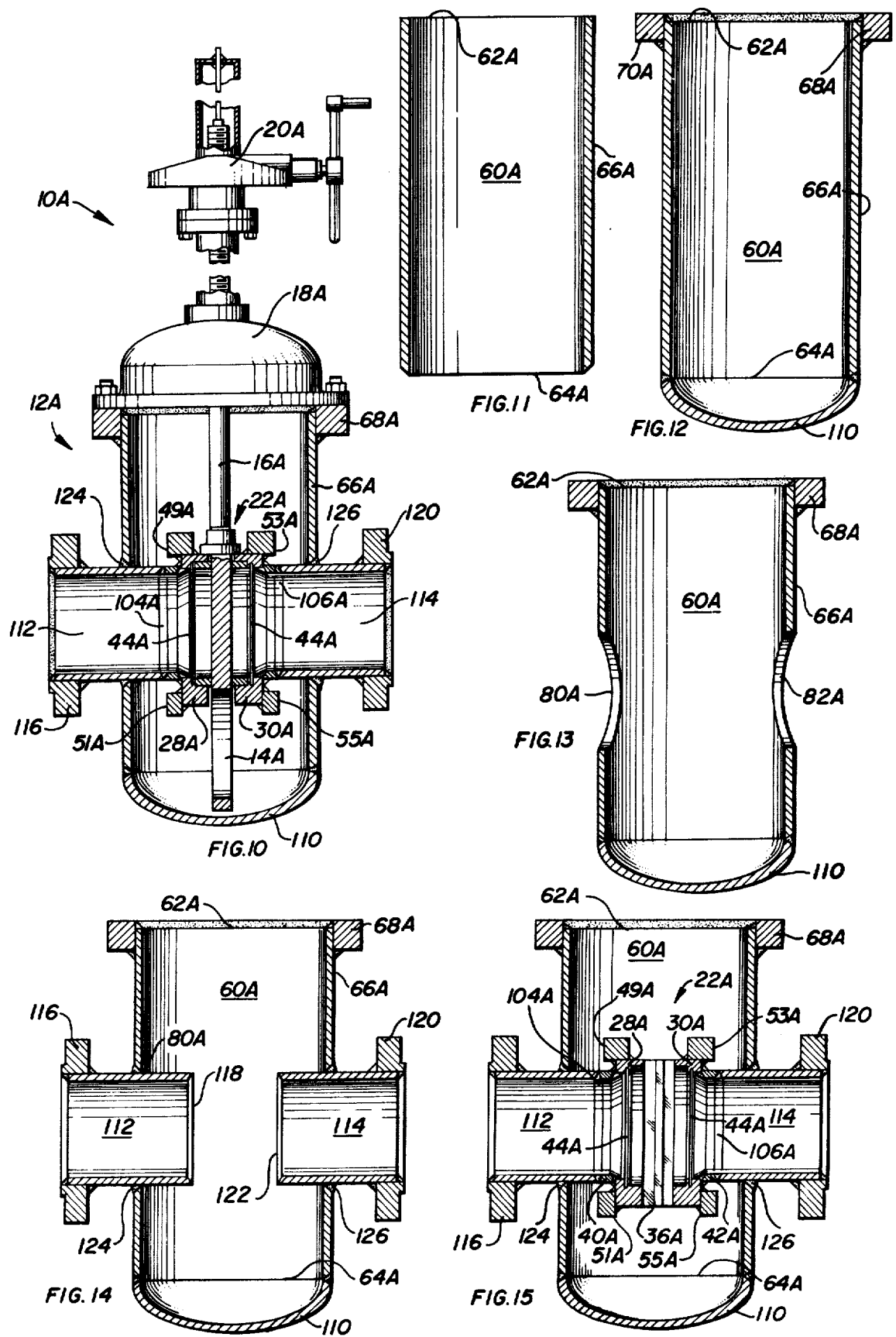

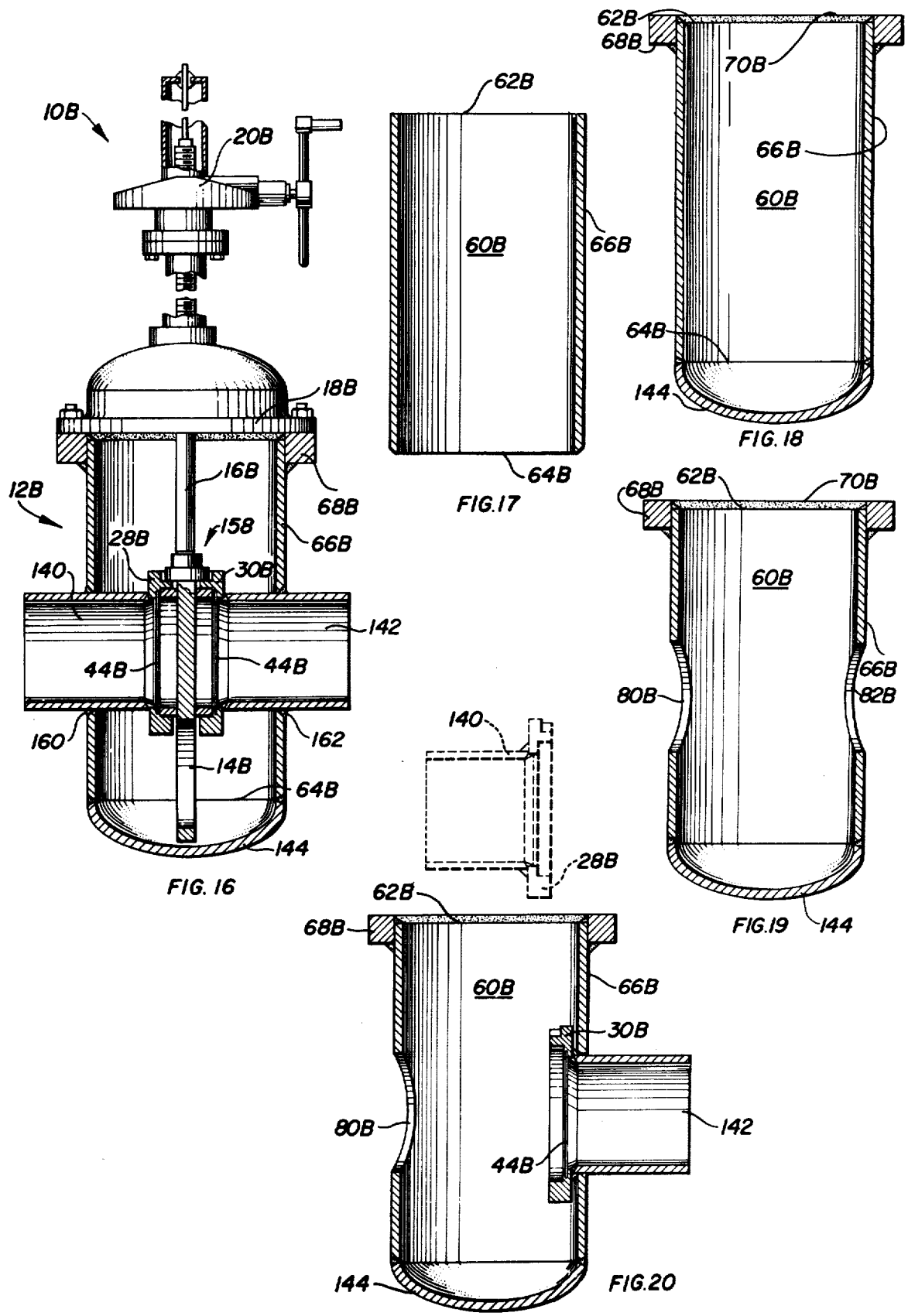

METHOD OF MAKING A FABRICATED GATE VALVE

CROSS REFERENCE TO RELATED APPLICATION

This is a continuation of pending patent application Ser. No. 734,155, filed Oct. 20, 1976, now abandoned, which is a continuation-in-part of prior patent application Ser. No. 623,236, filed Oct. 17, 1975, now abandoned.

BACKGROUND OF THE INVENTION

This invention is related to a method of fabricating gate valve bodies. Prior art methods of fabricating gate valve bodies involve the welding of unmachined inlet and outlet conduits to a fabricated body structure, then machining the seat ring surfaces, flanges and other surfaces. In order to do the machining at this time very large equipment must be used to precisely and accurately machine the seat ring pockets and other surfaces on the gate valve body structure. This machining process is extremely costly because it is time consuming and it requires very expensive and delicate machinery to accurately produce the required surfaces. In the fabrication and welding of gate valve bodies, they are generally constructed with conduits being welded to sides of the structure from the exterior of the valve body itself. No prior art fabricated gate valve structure is known wherein major welding of the seat assembly is done on the interior of the structure once the conduits are placed in the structure.

Prior art fabricated gate valves are usually stress relieved after they have been welded and before machining in order to minimize the warping and bending due to the welding process and to relieve residual stresses. These gate valves usually do not have a seat structure which will compensate for warpage and misalignment in the seat pocket zones which occur after the seat pockets are machined or while they are being machined.

SUMMARY OF THE INVENTION

The fabricated gate valve structures produced by the method of this invention include a valve body formed of a cross-sectionally round cylindrical member and a seat assembly which is constructed to compensate for warping during fabrication of the valve.

Generally the method of making a fabricated gate valve body of this invention includes fabricating a seat support assembly having a pair of seat support members and then finish machining of these members prior to welding them in place in the hollow body member. The method of this invention is shown and described herein in three (3) specific embodiments. Briefly, the method of manufacture of this invention includes fabricating and stress relieving a seat support assembly, then machining it to the finished dimensions, and then inserting the seat support assembly into a hollow body member and welding the seat support assembly inside the hollow body member.

One object of this invention is to provide a method of making gate valves which overcomes the aforementioned disadvantages of the prior art gate valve methods of manufacture.

Still, one other object of this invention is to provide a method of making a gate valve having a seat support assembly which is constructed to compensate for warping and misalignment of the seat support members during welding and which has a seat support assembly joined to inlet and outlet conduits of the hollow body by a weld joint formed and welded from the interior of the conduits and the seat support assembly.

Still, one other object of this invention is to provide a method of making a fabricated gate valve body structure wherein a seat support assembly is fabricated, then finish machined, and then inserted into and welded inside a hollow body member thus eliminating the need for tedious machining after assembly of the valve body.

Various other objects, advantages and features of this invention will become apparent to those skilled in the art from the following discussion, taken in conjunction with the accompanying drawings, in which:

DESCRIPTION OF THE DRAWINGS

FIG. 10 is a cutaway view of a complete fabricated gate valve structure having a rounded body bottom closure member and bonnet, and constructed in accordance with another embodiment, (2), of the method of manufacture of this invention;

FIG. 11 is a cross-sectional elevation view of a hollow body member for a second embodiment, (2), of the method of manufacture of this invention prior to welding on and cutting apertures in the hollow body member;

FIG. 12 is a cross-sectional view of a hollow body member for the valve structure shown in FIG. 11 with the rounded body bottom closure member and top flange welded in place;

FIG. 13 is a cross-sectional elevation of the hollow body member shown in FIG. 12 with opening cut in opposed sides of the hollow body members;

FIG. 14 is a cross-sectional elevation view of the hollow body member shown in FIG. 13 with conduit segments welded in place in the apertures;

FIG. 15 is a cross-sectional elevation view of the hollow body member shown in FIG. 14 with the seat support assembly welded in place between the conduit segments;

FIG. 16 is a cross-sectional elevation view of a completed fabricated gate valve and constructed by another embodiment, (3), of the method of manufacture of this invention;

FIG. 17 is a cross-sectional elevation view of a cylindrical hollow body member for a third, (3), embodiment of the method of manufacture of this invention prior to welding and cutting apertures in the hollow body member;

FIG. 18 is a cross-sectional elevation view of the hollow body member shown in FIG. 17 with a rounded lower body closure member and a top flange welded in place thereon;

FIG. 19 is a cross-sectional elevation view of the hollow body member shown in FIG. 18 with openings cut in opposed sides thereof for mounting conduits;

FIG. 20 is a cross-sectional elevation view of the hollow body member shown in FIG. 19 with one end portion of the seat support assembly positioned through one opening and the other end portion of the seat support assembly shown in dashed lines and positioned above the body prior to being inserted;

The following is a discussion and a description of the preferred specific embodiments of the method of making fabricated gate valves of this invention, such being made with reference to the drawings, whereupon the same referenced numerals are used to indicate the same or similar parts and/or structure. It is to be understood that such discussion and description is not to unduly limit the scope of the invention.

DETAILED DESCRIPTION

Figure 1:
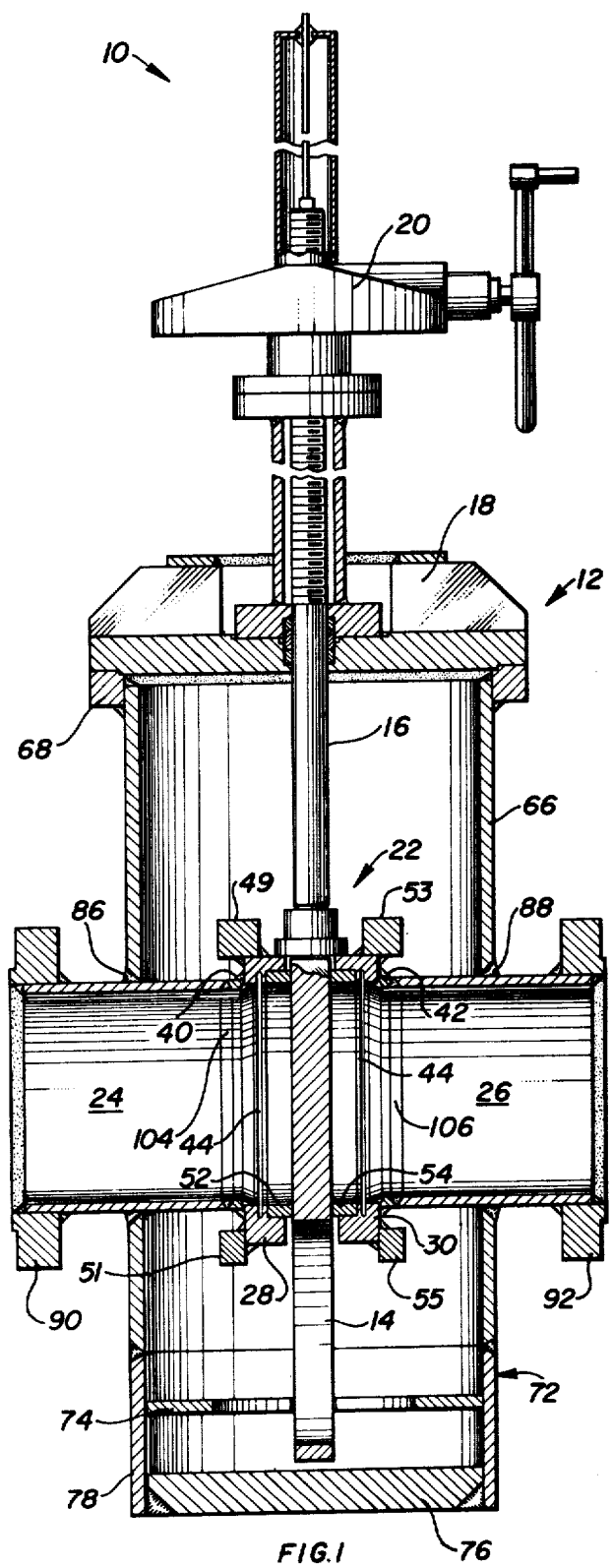
FIG. 1 is a cutaway elevation view of a completed fabricated valve produced by an embodiment, (1), the method of manufacture of this invention.

The structure of this invention is shown herein in two specific structural embodiments, (1), shown in FIGS. 1 and 10, and the other embodiment, (2), shown in FIG. 16. The method of manufacture of this invention is shown and disclosed herein in three procedural embodiments thereof. One embodiment of the method of manufacture, (2), is illustrated in FIGS. 11-15, and a third embodiment of the method of manufacture, (3), is illustrated in FIGS. 17-24. The gate valve body produced by the first two embodiments, (1) and (2), of the method of manufacture is shown in FIGS. 1 and 10 respectively. The gate valve body produced by the third embodiment, (3), of the method of this invention is shown completed in FIG. 16.

Valve Structure

FIG. 1 shows in cross section a structural embodiment, (1), of the gate valve with such indicated generally at 10. Gate valve 10 includes a valve body indicated generally at 12, which encloses a gate 14 with a stem 16 attached thereto and extending through bonnet 18. An actuator 20 is mounted atop bonnet 18 and connected to stem 16. Valve body 12 includes a seat support assembly, indicated generally at 22, which is mounted with inlet and outlet conduits and receives and movably mounts a gate 14. Seat support assembly 22 is shown in detail in FIGS. 8 and 9. Seat support assembly 22 is constructed as a separate unit then, as described in the method of manufacture hereinbelow, it is mounted with the remainder of the valve body structure. Seat support assembly 22 includes a pair of seat support members 28 and 30 having respective seat pockets 32 and 34 formed in the inner sides thereof. Seat support members 28 and 30 are joined together by side members 36 and 38 on opposite sides thereof. Side members 36 and 38 are plate-like spacer members secured to seat support members 28 and 30 by welding along the outer edge portions thereof as shown clearly in FIG. 9. Conduit segments 40 and 42 are joined to the outer ends of seat support members 28 and 30. It is very important to note the outer end portion of each conduit segment 40 and 42 is beveled toward the interior of the respective conduit. This particular beveling is done so that when conduit segments 40 and 42 are joined with the inlet and outlet conduits 24 and 36, these parts can be welded from the interior of the conduits. The significance of this feature of the invention will be apparent when assembly of this portion of the valve is described.

Figure 9:
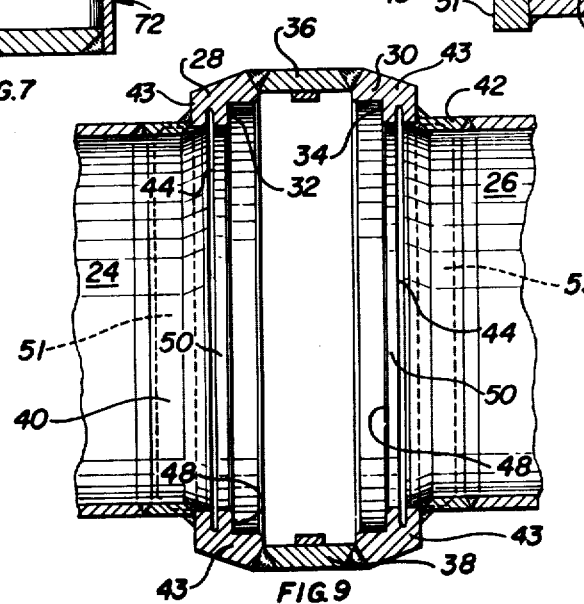
FIG. 9 is a cross-sectional view of the seat support assembly and adjoining conduits, with the view taken on a plane parallel to the elongated axis of the conduit and perpendicular to the elongated axis of the hollow body member.

An important feature of the seat support assembly 22 is in the structure of the seat support members in the area of the seat pockets 32 and 34. The interior of each seat support member 28 and 30 is constructed similarly. Each seat support member is constructed with an outer structural mounting cantilever beam portion 43 and an inner seat supporting cantilever beam portion 50. Referring to FIG. 9, outer structural cantilever beam 43 is formed by the outer portion of seat support members 28 and 30 and conduit segments 40 and 42 respectively. By regarding side members 36 and 38 as essentially rigid, the outer portion of the seat support members can be considered as a cantilever beam where the load is applied at the weld joint on the outer ends of conduit segments 40 and 42. In other words, outer cantilever beam portion 43 is a non-rigid portion of the seat support members which is connected to the conduits. This non-rigid portion of the structure can be considered as functioning like a cantilever beam thus it is referred to as a cantilever beam portion. Deflection of outer cantilever beam 43 is caused by shrinkage that occurs from welding conduit segments 40 and 42 to inlet and outlet conduits of valve body 12. Inner cantilever beam portion 50 forms an annular seat supporting lip and extends inwardly from outer cantilever beam portion 43 as shown. Inner and outer cantilever beam portions 43 and 50 are separated by a radially disposed inwardly opening groove 44. Groove 44 can be about essentially as deep as the radially disposed portion of the seat pockets in each of the seat support members. Groove 44 can be placed a distance from seat pocket bottom surface 48 which is less than or essentially equal to the groove depth dimension. Functionally, inner cantilever beam 50 and groove 44 maintain the fixed position of the seat pockets while outer cantilever beam 43 compensates for deformation, distortion, shrinkage and bending of seat support assembly 22 such as is encountered when welding the seat support assembly in place. When the welding takes place outer cantilever beam portion 43 deflects and this allows inner cantilever beam portion 50 and the seat pockets to remain essentially in a fixed position in seat support assembly 22. Outer cantilever beam portion 43 also deflects when bending forces are applied to the inlet and outlet conduits of valve body 12 so inner cantilever beam portion 50 can maintain the ring in a substantially fixed seat position. With a seat ring positioned in the seat pockets, a spring or some resilient portion of the seat ring rests on the pocket bottom surface 48 and it is in effect supported on the inner cantilever beam 50. When seat support assembly 22 is welded into position inside valve body 12, inlet conduit 24 and outlet conduit 26 are welded to conduit segments 40 and 42 at weld joints placed from the interior of the conduits. In this welding process shrinkage occurs at the weld joints and in the adjacent material, therefor seat support assembly 22 is subjected to tension forces. These tension forces tend to deform seat support members 28 and 30 by pulling outer cantilever beam portion 43 in a direction generally along the elongated axis of the conduits. The overall result of these welding induced forces is that the seat pocket portion of seat support assembly 22 is deformed; however, outer cantilever beam 50 deflects thereby isolating the valve seat pockets from deformation. FIG. 1 shows seat support assembly 22 with valve seats 52 and 54 positioned in the seat pockets of seat support members 28 and 30, respectively.

Figure 8:
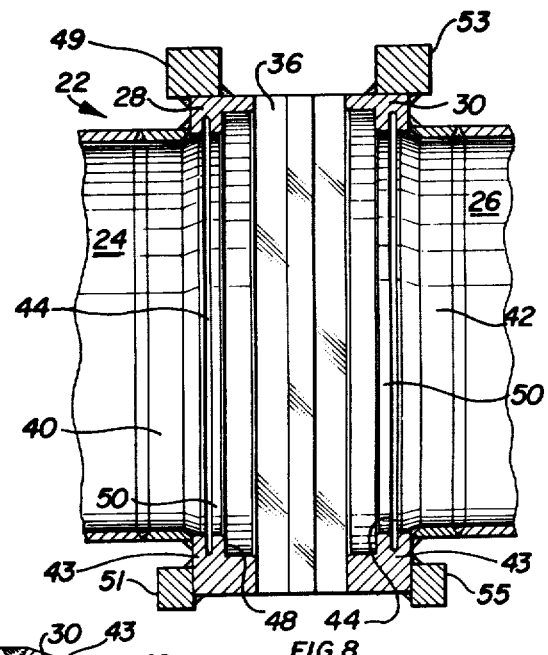
FIG. 8 is a cross-sectional view of the seat support assembly and adjoining conduits, with the view taken on a plane oriented parallel to the elongated axis of both the conduit and the hollow body member.

Another important feature of seat support assembly 22 is the ribbed construction of the seat support members. As shown in FIG. 8 seat support members 28 and 30 each have ribs on their upper and lower portions for stiffening. Seat support member 28 has an upper rib 49 and a lower rib 51 welded thereto as shown. Seat support member 30 has an upper rib 53 and a lower rib 55 welded thereto as shown. These ribs extend across span of the seat support members generally transverse to the elongated axis of the conduits for the purpose of providing resistance to bending of the seat support members in the direction of the conduits. The ribs shown are shorter than the width of the seat support members, thus they are not visible directly in FIG. 9.

These ribs 49, 51, 53 and 55 stiffen the seat support members 28 and 30 apart. The ribs can be welded to the seat support members as shown or they can be integrally formed if desired. In placing the ribs they can be located on top of the seat support members as ribs 49 and 53 are shown or they can be placed on the outer sides like ribs 51 and 55, depending upon specific structural requirements of a valve.

It is to be noted that the ribs and inner cantilever beam 50 both provide structural compensation for welding induced forces on the seat pockets. Although both the ribs and the inner cantilever beam 50 are shown it is to be understood that either alone may be used if desired or they may be used together if desired. Obviously, the choice of whether ribs or inner cantilever beam 50 or both are to be used will depend upon specific structural details of a valve body and components to be used therewith.

The second structural embodiment, (2), of the gate valve of this invention is shown in FIG. 16 and described in detail in the following at the point preceding a discussion of the method of making that embodiment.

Method of Manufacture

An embodiment, (1), of the method of manufacturing a fabricated gate valve body of this invention is illustrated in FIGS. 2–7 with FIG. 1 showing the completed and assembled valve structure. A preliminary step in the method of manufacture of this invention is to fabricate seat support assembly 22 for mounting later. Fabrication of seat support assembly 22 includes assembling and welding together seat support members 28 and 30, side plates 36 and 38 and conduit segments 40 and 42. Once seat support assembly 22 is welded together it is stress relieved by placing it in an oven for a predetermined time, then cooling. The length of time seat support assembly 22 is heated depends upon its thickest members. Generally heating at about eleven hundred (1,100) to about twelve hundred (1,200) degress Fahrenheit for one (1) hour for each inch of thickness is satisfactory. After stress relieving the seat ring pocket surfaces, all machined surfaces and any other specially shaped surfaces are shaped and machined to finish or final dimensions.

Figure 2:
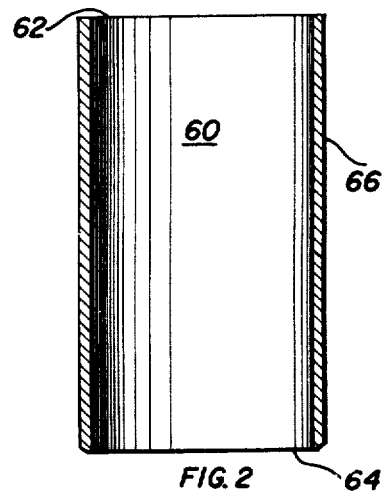
FIG. 2 is a cross-sectional elevation view of a hollow body member for the first embodiment, (1), of the method of manufacture prior to cutting apertures in the hollow body member.

The first step in this embodiment, (1), of the method of manufacturing of this invention is illustrated in FIG. 2 wherein a right cylindrical segment of cross-sectionally round conduit is shown. This conduit is referred to hereinafter as a hollow body member 60. The ends 62 and 64 of hollow body member 60 are preferably cut essentially perpendicular to the side wall 66. Ends 62 and 64 are hereinafter referred to as the upper end and the lower end, respectively.

Figure 3:
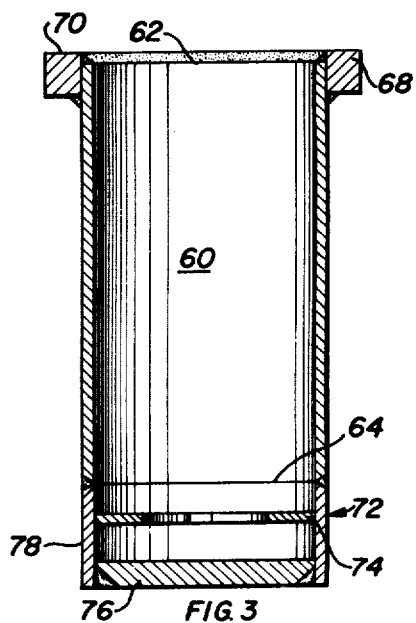
FIG. 3 is a cross-sectional elevation view of a hollow body member shown in FIG. 2 having a body bottom closure member welded in place and a top flanged member welded in place.

FIG. 3 shows the next step in this embodiment, (1), of the method of manufacture of this invention. In this step, a top flange 68 is welded to hollow body member upper end 62. Top flange member 68 is fully machined on its perimeter, its upper surface 70, and including all boring, drilling, tapping, etc., prior to being welded to side wall 66. Additionally, a body bottom closure member 72 is welded to hollow body member bottom end 64. Bottom closure member 72 is shown here in a fabricated form constructed from a ring 74 and an end plate 76 enclosed in and welded to a sleeve member 78. It is to be noted that any machining required on body bottom closure member 72 is done prior to welding it to side wall 66. The weld joint between lower end 64 and bottom closure member 72 is beveled so the welding can be completed from the exterior of the hollow body member.

Figure 4:
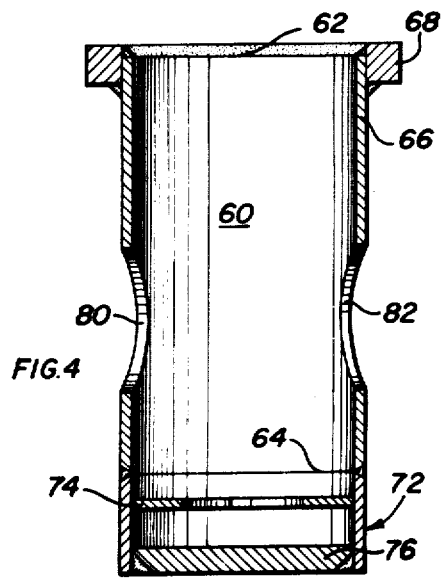
FIG. 4 is a cross-sectional elevation view of the hollow body member shown in FIG. 3 having openings cut in opposed sides thereof.

FIG. 4 illustrates the next step in this embodiment, (1), of the method of manufacture of this invention. In this step, openings or apertures 80 and 82 are cut through hollow body member side wall 66. Apertures 80 and 82 are positioned on opposed sides of the hollow body member through a mid-portion of the length of the structure, as illustrated. Apertures 80 and 82 are essentially the same size. Edges of the apertures are beveled toward the exterior of hollow body member 60.

Figure 5:
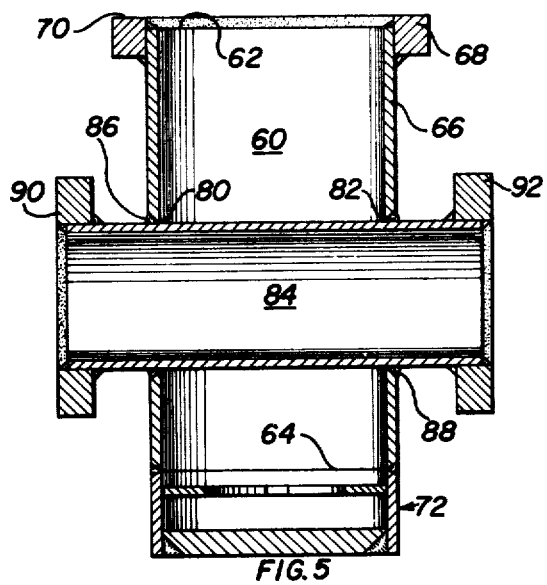
FIG. 5 is a cross-sectional elevation view of the hollow body members shown in FIG. 4 having a conduit extending through the openings and welded in place.

FIG. 5 illustrates the next step in this embodiment, (1), of the method of manufacture of this invention. In this step a conduit segment 84 is positioned through openings or apertures 80 and 82 and extends from opposite sides of hollow body member 60. Then when conduit segment 84 is positioned as desired it is welded to hollow body member side wall 66 on the exterior thereof at joints 86 and 88. Conduit 84 can have flanges 90 and 92 welded on opposite ends thereof as shown if desired. If flanges are desired they can be welded in place on conduit segment 84 after it is positioned through hollow body 60 or after it is welded to hollow body member 60.

The next step in this embodiment, (1), of the method of manufacturing a fabricated gate valve of this invention involves stress relieving of the gate valve body structure as completed so far. In this step the partially completed gate valve body structure is enclosed in an oven and heated for a predetermined time at a predetermined temperature then cooled to the room temperature. This stress relieving procedure relieves stresses on hollow body member 60 and conduit segment 84 so that warping and residual stresses are minimized. In practice it has been found acceptable to heat a valve body structure to approximately around eleven hundred (1,100) to twelve hundred (1,200) degrees Fahrenheit for a period of about one (1) hour for each inch of thickness of the thickest part.

Figure 6:
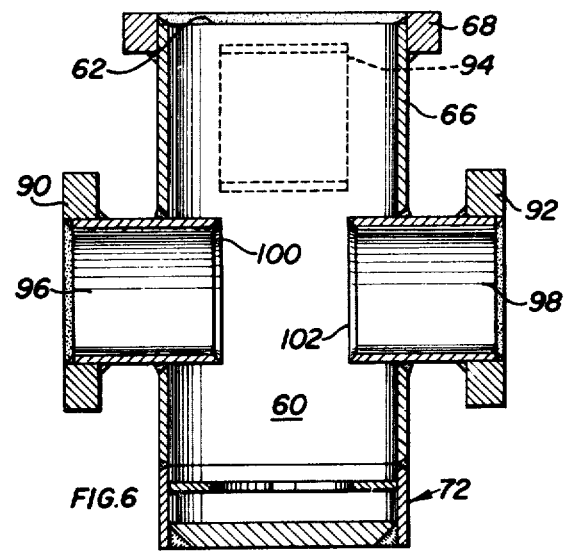
FIG. 6 is a cross-sectional elevation view of the hollow body member shown in FIG. 5 with a center portion of the conduit removed and shown in dashed lines and the remaining conduit segments having the inner end portions thereof beveled toward the interior of the conduits.

FIG. 6 illustrates the next step in this embodiment, (1), of the method of manufacturing a fabricated gate valve of this invention. In this step conduit segment 84 is cut and a center portion 94 is removed as shown in dashed lines thereby forming a pair of conduit segments 96 and 98 from conduit segment 84. Conduit segments 96 and 98 extend into a mid or center portion of the cavity of hollow body member 60 with the inner ends thereof 100 and 102 respectively being essentially planar and oriented parallel to the longitudinal axis of hollow body member 60 and peripendular to longitudinal axis of the conduit segments. After the conduit is cut the conduit segment ends 100 and 102 are beveled toward the interior of the respective conduit segments as shown clearly in FIG. 5. Conduit segment ends 100 and 102 preferably terminate in substantially planar surfaces which are arranged in an equidistant relation from the elongated central axis of hollow body member 60.

Figure 7:
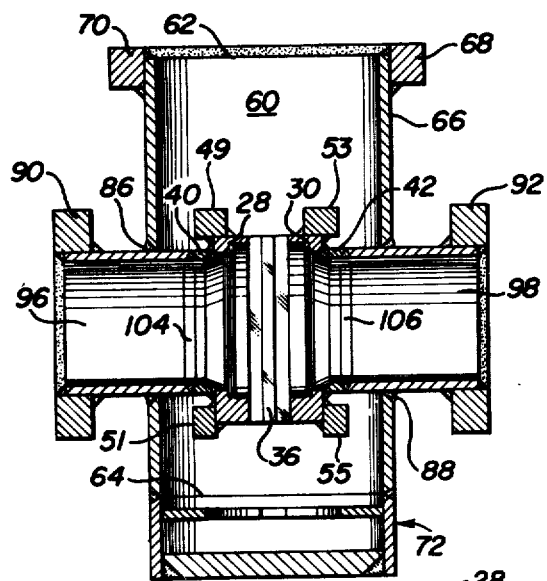
FIG. 7 is a cross-sectional elevation of the hollow body member shown in FIG. 6 with the seat support assembly welded in place.

FIG. 7 illustrates the next step in this embodiment, (1) of the method of manufacturing a fabricated gate valve of this invention. In this step, seat support assembly 22 is positioned inside the cavity of hollow body member 60 and seat support assembly 22 is welded to conduit inner ends 100 and 102 respectively. This step is very critical because placement and securing of seat support assembly 22 is important to insure proper placement of the seat members. In this step, seat support assembly 22 is positioned with an open portion thereof oriented toward body upper end 62 and top flange 68, also conduit segments 40 and 42 are aligned with inlet and outlet conduit segments 96 and 98. Before seat support assembly conduit segments 40 and 42 and conduit segments 96 and 98 are placed together for welding the adjoining ends of the conduit segments are beveled so the facing end surfaces thereof are divergent toward the interior of the conduits as shown clearly in FIGS. 6–9. Beveling these end surfaces is done so that weld joints 104 and 106 can be formed on the interior of the conduits by introducing filler material from inside the conduits. During the actual welding a temporary shield (S) (not shown) can be positioned over the critical portion (S) of seat support assembly 22 to prevent damaging the previously machined surfaces.

The specific procedure in welding seat support assembly in place can include several variations. In one specific procedure, seat support assembly 22, and the valve body including conduit segments 96 and 98 are substantially at room temperature prior to beginning the welding. The actual welding is done by a welder physically positioning himself inside the conduit and applying the weld bead from the interior of the conduit to form weld joints 104 and 106. A mechanical welding apparatus can also be used to form the weld joints. At this point it is to be noted that the novel cantilever beam end grooved construction of seat support assembly 22 minimizes deformation of the seat pockets as welded joints 104 and 106 cool. Specifically as the weld joints cool the material shrinks a certain extent as is well known in the art and this causes a tension force to be exerted on seat support assembly 22. The tension force lies generally along the elongated axis of conduits 24 and 26 and it causes deformation of outer cantilever beams 43. Because outer cantilever beams 43 are deflected, this to some extent prevents the force from being transmitted to the seat pocket area because of inner cantilever beams 50, therefore, deformation of the seat pockets is minimized. The amount of shrinkage which occurs due to weld joints 104 and 106 depends upon the volume of weld metal introduced into the joints as well as the material of construction and the physical size of the conduits. After the welding is completed, localized stress relieving can be done on the weld joints and the adjacent portions of the structure to reduce stresses, tension loads, and reduce material shrinkage. Local stress relieving can be done using electrical resistance heaters wrapped around the exterior or placed within the interior of the conduits or it can be done by conventional flame heating in the same local areas.

Another specific procedure for welding seat support assembly 22 in place includes preheating end portions of the conduits. In this procedure a weld zone is defined by beveled portions of the conduit ends and the adjoining portion of the conduits. First the conduits which are to be welded are heated to a predetermined temperature, then they are welded by introducing filler material into the beveled end portions of the conduits to form weld joints 104 and 106. Obviously, because of the elevated temperatures involved, mechanical welding apparatus is desirable for placing weld metal in weld joints 104 and 106. Heating of the weld zone and adjacent portions of the conduits is continued for a predetermined time after the weld joints are complete. The specific length of time this heating is continued depends upon the thickness of materials involved, then the structure is cooled. Preheating of the weld zone and adjacent portion of the conduits reduces the additional heat required during welding, it reduces the weld induced stresses in the materials, and it reduces shrinking due to welding. In general this heating reduces the tension forces on seat support assembly 22 which lessens the forces on outer cantilever beams 42 thereby decreasing distortion in the seat pocket portion of the seat assembly.

Another specific procedure in welding seat support assembly 22 involves deformation of the valve body 12 and conduits 24 and 26 prior to welding. In this procedure seat support assembly 22 and conduits 24 and 26 are sized such that the seat assembly cannot be placed between conduit ends 100 and 102 with valve body 12 in its normal condition at room temperature. In order to insert seat support assembly 22 between conduit ends 100 and 102 valve body 12 is elongated in the direction of the longitudinal axis of conduits 24 and 26 or seat support assembly 22 must be reduced in its longitudinal dimension. Once seat support assembly 22 is in place then it can be welded to the conduits. Elongation of the valve body can be accomplished in several ways, for example sides of the cylindrical body member 60 located transverse to the longitudinal axis of conduits 24 and 26 can be squeezed thus moved together which causes conduit ends 100 and 102 to be moved apart. Another manner in which cylindrical valve body member 60 can be elongated is by heating sides thereof in zones located transverse to the longitudinal axis of conduits 24 and 26 which causes expansion in the sides thus moving the conduit ends 100 and 102 apart. Another manner in which cylindrical valve body member 60 can be temporarily elongated is by mechanically separating the conduits such as pulling on the outer ends thereof sufficient to cause an outward displacement of inner ends 100 and 102.

An alternative to elongating valve body 12 is temporarily reducing the longitudinal dimension of seat support assembly 22 such as by immersing same in a cryogenic fluid or cooling same with so called dry ice. During the welding process it is not necessary that valve body 12 remain in the temporarily elongated configuration. Once seat support assembly 22 is in place between conduit ends 100 and 102 the welding can proceed from the interior of the conduits with or without preheating as described in detail above. By utilizing this specific procedure for welding the seat support assembly there is a distinct advantage in that shrinkage of the weld joints and the adjacent portions of the conduits is somewhat compensated for by compression of seat support assembly 22 between conduit ends 100 and 102. Ideally the distance which conduit ends 100 and 102 must be moved apart is selected as being equal to the amount of expected shrinkage.

Another specific procedure for welding seat support assembly 22 in place includes preheating of the joints between valve body sidewall 66 and conduits 24 and 26 prior to welding seat assembly 22 to conduits 24 and 26. In this procedure seat assembly 22 is positioned in valve body 12 between conduit ends 100 and 102 and supported by an appropriate jig or fixture (not shown). Once seat assembly 22 is in place weld joints 86 and 88 and adjacent portion of valve body sidewall 66 and conduits 24 and 26 respectively on the exterior of the valve are heated. This heating can be done by torches or electrical resistance heaters at the desire of the user. Heating is done sufficiently to allow a relaxation of residual stresses in the areas heated. After the heated areas reach a predetermined temperature, then welding of seat support assembly 22 to conduits 24 and 26 can proceed. As described above the forming of weld joints 104 and 106 is done from the interior of the conduits with appropriate shields placed over the previously machined portions of seat support assembly 22. Obviously, because of the elevated temperatures involved, mechanical welding apparatus is desirable for placing weld metal in weld joints 104 and 106. Heating of the areas described above can be continued after forming weld joints 104 and 106 for a predetermined time if desired or such heating can be terminated upon completion of the weld joints. Heating the juncture area of valve body sidewall 66 and conduits 24 and 26 function to relax residual stresses in these areas and thus allows an inward deformation of the valve body sidewall 66 around the conduits because the conduits are urged inward due to shrinkage of weld joints 104 and 106. A result of deformation of valve body sidewall 66 around conduits 24 and 26 is a reduction of tension forces on seat support assembly 22 which in turn lessens the forces on outer cantilever beams 42 thereby decreasing distortion in the seat pocket portion of the seat support assembly.

At the point where seat support assembly 22 is welded in place inside valve body 12, the valve body is substantially complete and it can be cooled, inspected, tested, etc. Once this is done the complete valve can be assembled using normal assembly methods to the configuration shown in FIG. 1.

In the following description, similar parts and/or structure of the gate valve which are similar to parts and/or structure described above have similar numerals followed by a letter "A" or "B" for clarity. The letter "A" relates the items to the second method embodiment, (2), and the letter "B" relates the items to the third method embodiment, (3).

Another embodiment, (2), of the method of fabricating a gate valve body structure of this invention is illustrated in FIGS. 10–15 with FIG. 10 showing the completed and assembled valve structure 10A. A preliminary step in carrying out the method of manufacture of this embodiment, (2), is to fabricate seat support assembly 22A for mounting with the remainder of the structure later. Fabrication of seat support assembly 22A includes the assembling and welding together of seat support members 28A and 30A, sides 36A and 38A, and conduit segments 40A and 47A as shown in FIGS. 8 and 9 where the assembled structure is depicted in cross section. Once seat support assembly 22A is welded together it is stress relieved by placing in an oven for a predetermined time then cooling. The length of time this unit is heated depends upon its thickest members as discussed above. Next, the seat ring pocket surfaces and all machined surfaces as well as any other shaped surfaces on seat support assembly 22A are finished to final dimensions.

FIG. 11 shows the initial step in this embodiment, (2), of the method of manufacture of the fabricated gate valve body of this invention. In FIG. 11, a right cylindrical segment of a cross-sectionally round conduit is shown. This conduit is referred to hereinafter as a hollow body member 60A. The ends 62A and 64A of hollow body member 60A are preferably cut essentially perpendicular to side wall 66A. Ends of 62A and 64A are hereinafter referred to as the upper end and the lower end respectively.

FIG. 12 shows the next step in this embodiment, (2), of the method of manufacture of a fabricated gate valve of this invention. In this step a top flange 68A is welded to upper hollow body member end 62A. Top flange member 68A is fully machined on its perimeter and its upper surface 70A, and including all boring, drilling, tapping, etc. prior to being welded to side wall 66A. Additionally, a bottom closure member 110 is welded to hollow body bottom member 64A. Body bottom closure member 110 is shown as a dish-like member with a partially spherically shaped center portion and inwardly curved edged portions which are joined with side wall 66A. It is to be noted that any machining required on bottom closure member 110 is done prior to welding it to side wall 66A. The weld joint between lower end 64A and bottom closure member 110 is beveled so the welding can be completed from the exterior of the hollow body member. It is to be noted that bottom closure member 110 differs structurally from bottom closure member 72 shown in FIGS. 1-7. Functionally, the structural differences are of no significance from a manufacturing standpoint, depending upon the capabilities of a particular manufacturer and the availability of the bowl-like members.

FIG. 13 illustrates the next step in this embodiment, (2), of the method of manufacture of this invention. In this step, openings or apertures 80A and 82A are cut through hollow body member side wall 66A. Apertures 80A and 82A are positioned in a transverse relation on the opposite sides of the hollow body member through the mid-portion of the length thereof, as illustrated. Apertures 80A and 82A are essentially the same size. Edges of the openings or apertures are beveled toward the exterior of hollow body members 60A so later conduits can be welded to the valve body from the exterior.

FIG. 14 illustrates the next step in this embodiment, (2), of the method of manufacture of this invention. In this step, the inlet and outlet conduit segments 112 and 114 are positioned through apertures 80A and 82A respectively and then the conduit segments are welded to side wall 66A. Conduit segment 112 is constructed with a flange 116 on the end portion thereof which is external to hollow body member 60A and its opposite inner end 118 is planar with the inside of the conduit being beveled toward the interior of the conduit. Conduit segment 114 has a flange 120 on the end thereof which is exterior to hollow body member 60A and its opposite inner end 122 is planar with the inside thereof beveled toward the interior of the conduit. Conduit segment ends 118 and 122 extend into a mid or center portion of the cavity of hollow body member 60A with the inner ends thereof 118 and 122 respectively being essentially planar and oriented parallel to the longitudinal axis of hollow body member 60A. Preferably a jig or mounting fixture (not shown) is used to mount and support conduit segments 112 and 114 in a rigid position with inner ends of the conduits being held in a parallel spaced relation while they are welded to side wall 66A and during the stress relieving step which follows. Conduit segment 112 is welded to side wall 66A at a weld joint 124 around the perimeter of the conduit at its juncture with side wall 66A. Likewise, conduit segment 114 is welded to side wall 66A at a weld joint 126 at the juncture of the conduit section and the side wall. Where hollow body member 60A is cross-sectionally round, then conduit segment ends 118 and 122 preferably terminate in an equidistant relation from the elongated axis of hollow body member 60A.

The next step in this embodiment, (2), of the method of manufacturing a fabricated gate valve of this invention involves stress relieving of the gate valve body structure in its partially completed condition. In this step the partially completed gate valve body structure as described in the preceding paragraph is enclosed in an oven and heated for a predetermined time at a predetermined temperature then cooled to room temperature. The stress relieving procedure functions to relieve stresses on hollow body member 60A and conduit segments 112 and 114 and in other portions of the structure so that warping and residual stresses in the structure are minimized or significantly reduced. In practice it is expected that for common materials used in pipeline grade valves it will be acceptable to heat the valve body structure to between about eleven hundred (1,100) to twelve hundred (1,200) degrees Fahrenheit for a period of about one (1) hour for each inch of thickness of the thickest part. Preferably during the heating and cooling in this stress relieving step the jig or mounting fixture used for positioning conduit segments 112 and 114 remains in position on the members of the structure so conduit segment ends 118 and 122 remain essentially in their aligned and spaced relation.

FIG. 15 illustrates the next step in this embodiment, (1) of the method of manufacturing a fabricated gate valve of this invention. In this step, seat support assembly 22A is positioned inside the cavity of hollow body member 60A and seat support assembly 22A is welded to conduit inner ends 118 and 122 respectively. This step is very critical because placement and securing of seat support assembly 22A is important to insure proper placement of the seat members. In this step, seat support assembly 22A is positioned with an open portion thereof oriented toward body upper end 62A and top flange 68A, also conduit segments 40A and 42A are aligned with inlet and outlet conduit segments 112 and 114. Before seat support assembly conduit segments 40A and 42A and conduit segments 112 and 114 are placed together for welding the adjoining ends of the conduit segments the facing end surfaces thereof are divergent toward the interior of the conduits as shown clearly in FIGS. 6-9. Beveling these end surfaces is done so that weld joints 104A and 106A can be formed on the interior of the conduits by introducing filled material from inside the conduits. During the actual welding a temporary shield (S) (not shown) can be positioned over the critical portion (S) of seat support assembly 22A to prevent damaging the previously machined surfaces.

The specific procedure in welding seat support assembly 22A in place includes several variations. In one specific procedure, seat support assembly 22A, and the valve body including conduit segments 96 and 98 are substantially at room temperature prior to beginning the welding. The actual welding is done by a welder physically positioning himself inside the conduit and applying the weld bead from the interior of the conduit to form weld joints 104A and 106A. A mechanical welding apparatus can also be used to form the weld joints. At this point it is to be noted that the novel cantilever beam end grooved construction of seat support assembly 22A minimizes deformation of the seat pockets as welded joints 104A and 106A cool. Specifically as the weld joints cool the material shrinks a certain extent and this causes a tension force to be exerted on seat support assembly 22A. The tension force lies generally along the elongated axis of conduits 112 and 114 and it causes deformation of outer cantilever beams 43. Because outer cantilever beams 43 are deflected, this to some extent prevents the force from being transmitted to the seat pocket area because of inner cantilever beams 50, therefore, deformation of the seat pockets is minimized.

The amount of shrinkage which occurs due to weld joints 104A and 106A depends upon the volume of weld metal introduced into the joints as well as the material of construction and the physical size of the conduits. After the welding is completed, localized stress relieving can be done on the weld joints and the adjacent portions of the structure to reduce stresses, tension loads, and reduce material shrinkage. Local stress relieving can be done using electrical resistance heaters wrapped around the exterior or placed within the interior of the conduits or it can be done by conventional flame heating in the same local area.

Another specific procedure for welding seat support assembly 22A in place includes preheating end portions of the conduits. In this procedure a weld zone is defined by beveled portions of the conduit ends and the adjoining portion of the conduit ends and the adjoining portion of the conduits. First the conduits which are to be welded are heated to a predetermined temperature, then they are welded by introducing filler material into the beveled end portions of the conduits to form weld joints 104A and 106A. Obviously, because of the elevated temperatures involved, mechanical welding apparatus is desirable for placing weld metal in weld joints 104A and 106A. Heating of the weld zone and adjacent portions of the conduits is continued for a predetermined time after the weld joints are complete. The specific length of time this heating is continued depends upon the thickness of materials involved, then the structure is cooled. Preheating of the weld zone and adjacent portions of the conduits reduces the additional heat required during welding, it reduces the weld induced stresses in the materials, and it reduces shrinking due to welding. In general this heating reduces the tension forces on seat support assembly 22A which lessens the forces on outer cantilever beams 43 thereby decreasing distortion in the seat pocket portion of the seat assembly.

Another specific procedure in welding seat support assembly 22A involves deformation of the valve body 12A and conduits 112 and 114 prior to welding. In this procedure seat support assembly 22A and conduits 112 and 114 are sized such that the seat assembly control cannot be placed between conduits ends 118 and 122 with valve body 12A in its normal condition at room temperature. In order to insert seat support assembly 22A between conduit ends 118 and 122 valve body 12A is elongated in the direction of the longitudinal axis of conduits 112 and 114 or seat support assembly 22A must be reduced in its longitudinal dimension. Once seat support assembly 22A is in place then it can be welded to the conduits. Elongation of the valve body can be accomplished in several ways, for example sides of the cylindrical body member 60A located transverse to the longitudinal axis of conduits 112 and 114 can be squeezed thus moved together which causes conduit ends 118 and 122 to be moved apart. Another manner in which cylindrical valve body member 60A can be elongated is by heating sides thereof in zones located transverse to the longitudinal axis of conduits 112 and 114 which causes expansion in the sides thus moving the conduit ends 118 and 122 apart. Another manner in which cylindrical valve body member 60A can be temporarily elongated is by mechanically separating the conduits such as pulling on the outer ends thereof sufficient to cause an outward displacement of inner ends 118 and 122.

An alternative to elongating valve body 12A is temporarily reducing the longitudinal dimension of seat support assembly 22A such as by immersing same in a cryogenic fluid or cooling same with so called dry ice. During the welding process it is not necessary that the valve body 12A remain in the temporarily elongated configuration. Once seat support assembly 22A is in place between conduit ends 118 and 122 the welding can proceed from the interior of the conduits with or without preheating as described in detail above. By utilizing this specific procedure for welding the seat support assembly there is a distinct advantage in that shrinkage of the weld joints and the adjacent portions of the conduits is somewhat compensated for by compression of seat support assembly 22A between conduit ends 118 and 122. Ideally the distance which conduit ends 118 and 122 must be moved apart is selected as being equal to the amount of expected shrinkage.

Another specific procedure for welding seat support assembly 22A in place includes preheating of the joints between valve body sidewall 66A and conduits 112 and 114 prior to welding seat assembly 22A to conduits 112 and 114. In this procedure seat assembly 22A is positioned in valve body 12A between conduit ends 118 and 122 and supported by an appropriate jig or fixture (not shown). Once seat assembly 22A is in place weld joints 124 and 126 and adjacent portions of valve body sidewall 66A and conduits 112 and 114 respectively on the exterior of the valve are heated. This heating can be done by torches or electrical resistance heaters at the desire of the user. Heating is done sufficiently to allow a relaxation of residual stresses in the areas heated. After the heated areas reach a predetermined temperature, then welding of seat support assembly 22A to conduits 112 and 114 can proceed. As described above the forming of weld joints 104A and 106A is done from the interior of the conduits with appropriate shields placed over the previously machined portions of seat support assembly 22A. Obviously, because of the elevated temperatures involved, mechanical welding apparatus is desirable for placing weld metal in weld joints 104A and 106A. Heating of the areas described above can be continued after forming weld joints 104A and 106A for a predetermined time if desired or such heating can be terminated upon completion of the weld joints. Heating of juncture area of valve body sidewall 66A and conduits 112 and 114 function to relax residual stresses in these areas and thus allows an inward deformation of the valve body sidewall 66A around the conduits because the conduits are urged inward due to shrinkage of weld joints 104A and 106A. A result of deformation of valve body sidewall 66A around conduits 112 and 116 is a reduction of tension forces on seat support assembly 22A which in turn lessens the forces on outer cantilever beams 42A thereby decreasing distortion in the seat pocket portion of the seat support assembly.

At the point where seat support assembly 22A is welded in place inside valve body 12A, the valve body is substantially complete and it can be cooled, inspected, tested, etc. Once this is done the complete valve can be assembled using normal assembly methods to the configuration shown in FIG. 10.

FIG. 16 shows in cross section a second structural embodiment, (2), of the fabricated gate valve of this invention with such being indicated generally at 10B. Gate valve 10B includes a valve body, indicated generally at 12B, which encloses a gate 14B with a stem 16B attached thereto and extending through bonnet 18B. An actuator 20B is mounted atop bonnet 18B and connected to stem 16B. Valve body 12B includes a seat support assembly, indicated generally at 158 which is on the inner end portions of inlet and outlet conduits 140 and 142 respectively. Seat support assembly 158 receives and mounts gate 14B. Seat support assembly 158 consists of seat support members 28B and 30B mounted on the inner ends of conduits 140 and 142. Seat support members 28B and 30B are similar to that shown in detail in FIGS. 8 and 9 and as described hereinabove including the novel cantilever beam structure. In this embodiment, (2), seat support assembly 158 has seat support members 28B and 30B attached to conduit segments 140 and 142 which are assembled and welded inside valve body 12B.

Figure 24:
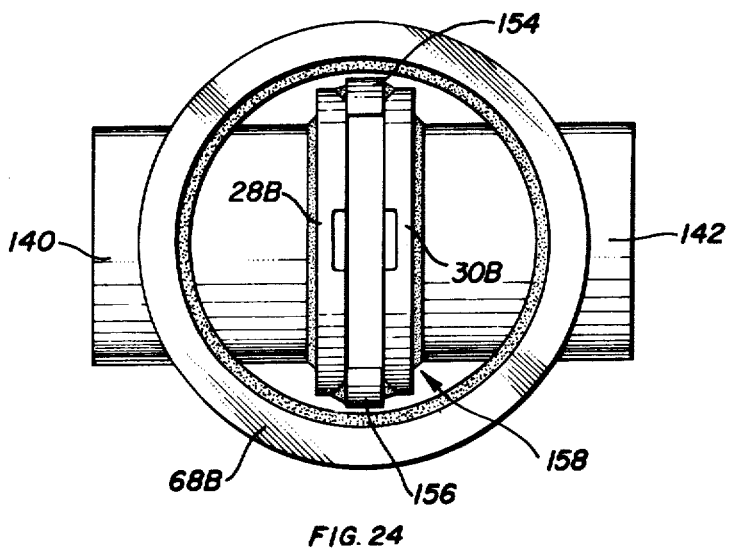
FIG. 24 is a top plan view of the fabricated gate valve body shown in FIG. 22 with both seat support assembly sides welded in place on the seat support assembly, and the seat support assembly being welded in place.

Seat support assembly 158 in this structural embodiment, (2), is essentially the same as the first described seat support assembly 22 and includes the important features of the outer cantilever beam 43B, the groove 44B, and the inner cantilever beam in each of the seat support members. In this structure the cantilever beams serve the same purpose as described above namely to allow seat support assembly 158 to compensate for and distribute the welding induced forces and other forces on seat support assembly 158. In seat support assembly 158 the seat support members 28B and 30B are secured together by seat support assembly side members 154 and 156 and they are directly attached to the inlet and outlet conduits as shown in FIG. 24. For brevity, the detailed description of the seat support members is not repeated here to avoid a duplication of the description set forth above with the first described structural embodiment, (1), of this invention.

Another embodiment, (3), of the method of manufacturing a fabricated gate valve body of this invention is illustrated in FIGS. 17–24 for the completed and assembled gate valve structure 10B shown in FIG. 16. A preliminary step in this method, (3), of manufacture is to fabricate the conduit segments and seat support members for assembly later. Conduit segments 140 and 142 are constructed with seat support members 28B and 30B respectively mounted thereon. Seat support rings 28B and 30B are roughly O-shaped and then welded to conduit segments 140 and 142. After welding these conduit segments are stress relieved by heating in an oven for a predetermined time. The time and temperature for this stress relieving is done in accordance with guidelines set out above. After stress relieving of these segments seat support rings 28B and 30B are completely finish machined. Generally speaking, conduit segments 140 and 142 are constructed as similar but separate units and all machine surfaces as well as any other special shaped surfaces thereon are finished to final dimensions when the units are complete. Only after the units are complete are they placed in and welded to the valve body.

The first step in this embodiment, (3), of the method of manufacture of this invention is illustrated in FIG. 17 wherein a right cylindrical segment of cross-sectionally round conduit is shown. This conduit is referred to hereinafter as a hollow body member 60B. The ends 62B and 64B of hollow body member 60B are preferably cut essentially perpendicular to side wall 66B. Ends 62B and 64B are hereinafter referred to as the upper end and the lower end respectively.

FIG. 18 shows the next step in this embodiment, (3), of the method of manufacture of this invention. In this step a top flange 68B is welded to hollow body member upper end 62B. Top flange member 68B is fully machined on its perimeter, its upper surface 70B and including all boring, drilling, tapping, etc., prior to being welded to side wall 66B. Additionally, a body bottom closure member 144 is welded to hollow body member bottom end 64B. Body bottom closure member 144 is shown as a bowl-shaped member having a substantially spherically shaped center portion with inwardly turned edge portions which are welded to side wall 66B at bottom end 64B. It is to be understood that the bottom closure member in this structure can differ from that shown without departing from the scope of the invention. The specific bottom closure member used on a particular valve structure is insignificant and as far as the method of manufacture of this invention is concerned. Bottom closure member 144 is beveled so that welding can be completed from the exterior of hollow body member 60B.

FIG. 19 illustrates the next step of this embodiment, (3), of the method of manufacture of this invention. In this step, openings or apertures 80B and 82B are cut through hollow body side walls 66B. Apertures 80B and 82B are positioned on opposite sides of the hollow body member through a mid-portion of the length thereof as illustrated. Apertures 80B and 82B are essentially the same size. Edges of the apertures are beveled toward the exterior of hollow body member 60B.

The next step in this embodiment, (3), of the method of manufacture of this invention involves stress relieving of the partially completed body as shown in FIG. 19. In this step the body as shown in FIG. 19 is placed in an oven and heated for a predetermined time at a predetermined temperature then cooled. Heating is done at the generally commonly accepted rate for steels of between about eleven hundred (1,100) to twelve (1,200) hundred degrees Fahrenheit for a period of about one (1) hour for each inch of thickness of the thickest part thereof. This procedure relieves stresses in the body caused by welding on top flange 68B and bottom closure member 144, and any stresses resulting from cutting or burning openings 80B and 82B. It is significant to note that stress relieving the body at this stage obviates the need to stress relieve the entire body at a later time.

FIG. 20 illustrates the next step of this embodiment, (3), of the method of manufacture of this invention. In this step, conduit segment 142 is inserted into the cavity of hollow body member 60B with the conduit portion thereof oriented toward aperture or opening 82B. Conduit segment 142 is aligned with aperture 82B and inserted through aperture 82B to the position as shown in FIG. 20. Conduit segment 142 is positioned with the conduit side seat ring support member 30B contacting inner surface portions of side wall 66B.

Figure 21:
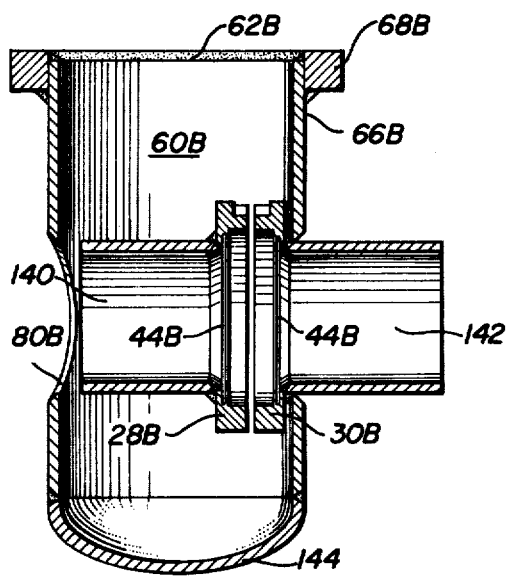
FIG. 21 is a cross-sectional elevation view of the hollow body member shown in FIG. 20 with the other end portion of the seat support assembly positioned inside the hollow body member cavity and adjacent to the other openings.

FIGS. 20 and 21 illustrate the next step in this embodiment, (3), of the method of manufacture of this invention. In this step, conduit 140 is positioned as shown in dashed lines in FIG. 20. Notice in this position the gate side of seat ring support member 28B is directed in opposing relation toward seat ring support member 30B. Next, conduit segment 140 is inserted into the cavity of hollow body member 60B to a position as shown in FIG. 21. Next, the conduit portion of conduit segment 140 is passed through aperture 80B to a point which places seat ring support member 28B in a mid-portion of the cavity of a hollow body member 60B.

Figure 22:
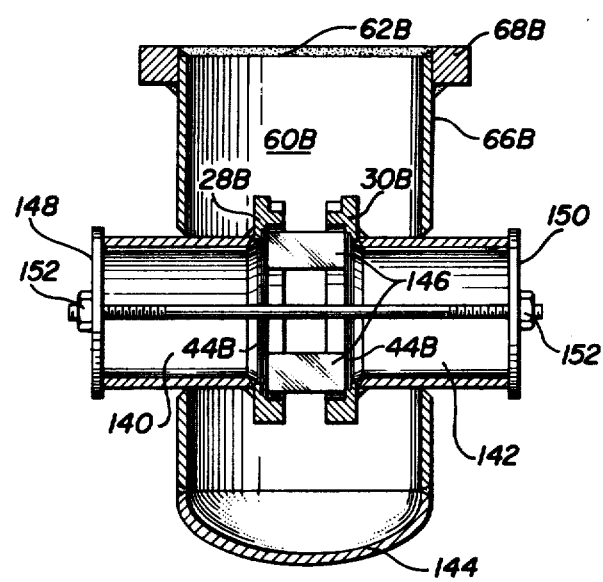
FIG. 22 is a cross-sectional elevation view of the hollow body member and seat support assembly shown in FIG. 21 with both end portions of the seat support assembly positioned through the openings and shown with a mounting fixture having spacing blocks positioned between the seat pockets, and a clamp assembly joining the outer end portions of the conduits.

FIG. 22 illustrates the next step in this embodiment, (3), of the method of manufacture of this invention. In this step, the conduit segments 140 and 142 are positioned with seat support members 28B and 30B in a spaced relation in a center portion of hollow body member 60B and a suitable mounting fixture or alignment jig is mounted with the conduit segments to position them in the desired space relation to each other and inside the cavity of the body member. Spacing blocks 146 are positioned between opposing surfaces and the seat support members 28B and 30B; conduit end plate support members 148 and 150 are positioned on opposed ends of conduit segments 140 and 142 respectively and a bolt or suitable tightening structure 152 is connected between support members 148 and 150 to draw conduit segments 140 and 142 together thereby holding spacing blocks 146 in place and properly spacing the seat support members. The mounting fixture or jig shown is only one example of several physical jig constructions which can be used to support conduit segments 140 and 142 in a fixed position relative to each other for welding. Any suitable mounting fixture can be used.

Figure 23:
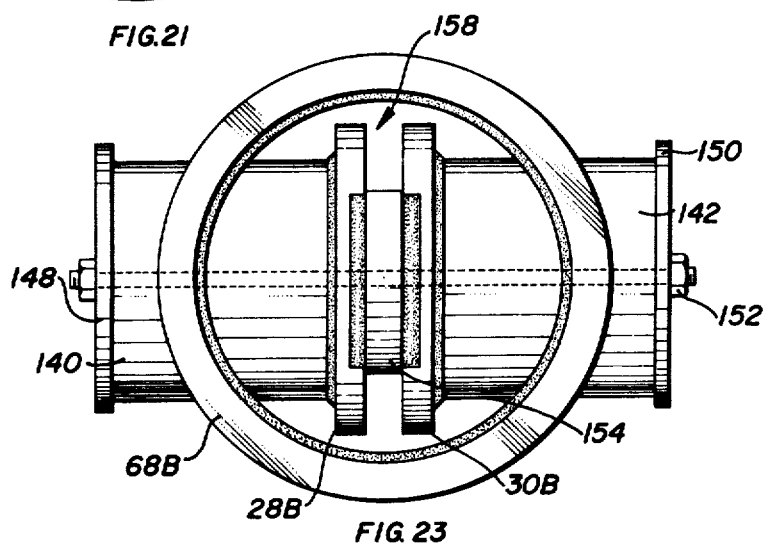
FIG. 23 is a top plan view of the fabricated gate valve body structure shown in FIG. 22 including the mounting fixture and showing a seat support assembly side welded in place on the visible side of seat support assembly.

FIG. 23 illustrates the next step in this embodiment, (3), of the method of manufacture of this invention. In this step, a seat support assembly side member is welded onto one side of the seat support members 28B and 30B. The conduit segments 140 and 142 are positioned so that the side portion of seat support members 28B and 30B which are to have a support plate mounted thereon are turned so that particular side portion of the structure is oriented toward the open end of hollow body member 60B or toward top flange 68B. A seat support assembly side member 154 is positioned on that particular side of seat support members 28B and 30B as illustrated, and then it is welded to the seat support members. During welding of the support plates to the seat support members the mounting fixture or jig is used to keep the members in place. After plate 154 is welded in place the conduit segments are rotated approximately 180° about their longitudinal axis so another similar side member 156 can be welded on the opposite side of seat support members 28B and 30B. Support assembly side members 154 and 156 function as spacers to retain and hold seat support members 28B and 30B in the proper spaced relation in the permanent structure.

FIG. 24 illustrates the next step in this embodiment, (3), of the method of manufacture of this invention. In this step, the seat support assembly 158 on its connected conduit segments 140 and 142 are rotated approximately 90° about the longitudinal axis of the conduit segments from a position shown in FIG. 23 so that open spaces of seat support assembly 158 are approximately centered in hollow body member 60B. Next, conduit segments 140 and 142 are welded to side wall 66B at the juncture of the conduits and the side wall by weld joints formed from the exterior of the valve body structure. FIG. 16 shows weld joint 160 which connects side wall 66B and conduit segment 140 and weld joint 162 which connects side wall 66B and conduit segment 142.

At this point in this embodiment, (3), of the method of manufacturing of this invention, a stress relieving step can be included. This step may or may not be necessary depending upon the specific design of a particular valve. In this step, the inlet and outlet conduit segments are heated for a predetermined time at a predetermined temperature and cooled to room temperature. During heating and cooling the mounting fixture can be left in place. This procedure relieves stresses in weld joints 160 and 162 and in conduit segments 140 and 142 so that warping and residual stresses from the welding are minimized. It is expected that for pipeline grade valves that in practice it will be acceptable to heat the specific members to approximately around eleven hundred (1,100) to twelve hundred (1,200) degrees Fahrenheit for a period of around one (1) hour for each inch of thickness of the thickest part.

At this point fabricated valve body 12B is complete and once it has cooled, been inspected, tested and etc., the complete valve can be assembled in the configuration as shown in FIG. 16.

In practicing the method of manufacturing of this invention it is obvious that such method can be used to fabricate gate valve structures and achieve the end product of a structurally sound gate valve body. This method of manufacture utilizes basic welding end assembly techniques and combines them in a novel sequence of steps for the making of a completely fabricated gate valve body structure. The specific gate valve body structure of this invention can be easily manufactured by following any of the method embodiments of this invention as set out herein. The novel seat support assembly structure including the groove therein can be constructed by conventional machining and assembly techniques and with conventional materials to achieve the end product.

In use of the method of manufacture of this invention it is seen that same provides a simple yet novel method of assembling or manufacturing a completely fabricated gate valve body structure. Additionally, it is seen that the novel weld structure and seat support assembly structure are particularly adapted for a welded configuration and they can be easily assembled by the method of manufacture described herein.

As will become apparent from the foregoing description of the applicants' gate valve body structure and the method of making same a relatively inexpensive and simple method of manufacture has been provided to produce gate valve bodies. The body structure is economical to manufacture in that relatively small machines can be used to cut and shape critical portions of the structure. The method of manufacturing is economical in that it uses simple steps, premachined parts, and will utilize only a minimum of jig fixtures and other tooling to support the several parts as they are being assembled and joined together.

We claim:

1. A method of making a fabricated gate valve body structure, comprising the following steps:
  (a) forming a pair of openings through a hollow cylindrical body member with the openings being in axial transverse alignment;
  (b) inserting a straight continuous conduit through the openings to position the conduit in extension through the body member with opposite ends of the conduit spaced outwardly of the body member;
  (c) welding the conduit to the body member about each opening with the conduit in a single integral piece;
  (d) stress relieving the welds by heating the body member and conduit at a predetermined elevated temperature for a predetermined time then cooling with the conduit in a single integral piece to minimize thermally induced distortion, whereby the conduit is maintained in a straight condition;
  (e) thereafter cutting and removing an intermediate segment of the conduit within the body member to form a pair of outer conduit segments which have inner ends spaced apart inside of the body member and which are axially aligned due to the straight condition of the conduit from which the outer conduit segments are formed;
  (f) providing a pair of seat support members each having a cylindrical inside surface which presents in an inner end portion thereof a seat pocket of a predetermined depth for receiving a valve seat;
  (g) forming in the inside surface of each seat support member an annular groove having a depth substantially equal to said predetermined depth and located to provide on the inner side of the groove an annular seat supporting lip adjacent the seat pocket and on the outer side of the groove an annular cantilever beam which is substantially equal in size to the lip and which is capable of flexing at the groove relative to the lip to minimize distortion of the lip;

(h) welding a pair of opposed side members to the seat support members to space the support members a predetermined distance apart with the seat pockets in opposition to one another for receiving a gate valve member therebetween;

(i) welding a cylindrical inner conduit segment to the cantilever beam of each seat support member in outward extension therefrom to form a prefabricated seat support assembly which is separate from the body member;

(j) stress relieving the seat support assembly by heating at a predetermined elevated temperature for a predetermined time then cooling with the seat support assembly separate from the body member;

(k) inserting the seat support assembly in the body member with ends of the inner conduit segments abutting the inner ends of the outer conduit segments; and (l) welding the inner conduit segments to the outer conduit segments from the inside of the conduit segments to mount the seat support assembly in the body member.

2. A method as set forth in claim 1, including the step of welding a flange on each of said opposite ends of the conduit to provide flanges on the outer ends of the outer conduit segments.

3. A method as set forth in claim 1, including the step of welding a flange on a top end portion of said body member.

* * * * *